United States Patent
Smahl et al.

(10) Patent No.: US 9,822,915 B2
(45) Date of Patent: Nov. 21, 2017

(54) PIPE CONNECTION

(75) Inventors: Jarmo Smahl, Nastola (FI); Peter Hauki, Virsbo (SE); Thomas Larsson, Kungsör (SE); Yngve Lundequist, Virsbo (SE); Mats Hållen, Virsbo (SE)

(73) Assignee: Uponor Innovation Ab, Virsbo (SE)

( * ) Notice: Subject to any disclaimer, the term of this patent is extended or adjusted under 35 U.S.C. 154(b) by 565 days.

(21) Appl. No.: 11/994,858

(22) PCT Filed: Jul. 7, 2006

(86) PCT No.: PCT/FI2006/050322
§ 371 (c)(1),
(2), (4) Date: May 16, 2008

(87) PCT Pub. No.: WO2007/006863
PCT Pub. Date: Jan. 18, 2007

(65) Prior Publication Data
US 2008/0315579 A1    Dec. 25, 2008

(30) Foreign Application Priority Data
Jul. 8, 2005  (EP) .................................. 05106243

(51) Int. Cl.
| | |
|---|---|
| *F16L 47/22* | (2006.01) |
| *B29C 45/00* | (2006.01) |
| *B29C 65/68* | (2006.01) |
| *B29C 65/00* | (2006.01) |
| *B29C 57/02* | (2006.01) |

(Continued)

(52) U.S. Cl.
CPC .......... *F16L 47/22* (2013.01); *B29C 45/0025* (2013.01); *B29C 65/68* (2013.01); *B29C 66/1122* (2013.01); *B29C 66/1142* (2013.01); *B29C 66/522* (2013.01); *B29C 66/54* (2013.01); *B29C 57/02* (2013.01); *B29C 65/02* (2013.01); *B29C 66/547* (2013.01); *B29C 66/71* (2013.01); *B29C 66/73715* (2013.01); *B29C 2045/0027* (2013.01); *B29K 2023/0691* (2013.01); *F02M 35/10354* (2013.01); *Y10T 403/1624* (2015.01); *Y10T 403/27* (2015.01)

(58) Field of Classification Search
USPC ......... 285/187, 242, 256, 259, 381.1, 381.4, 285/909, 288.1, 288.3–288.6, 288.9, 285/294.1, 294.4, 423
See application file for complete search history.

(56) References Cited

U.S. PATENT DOCUMENTS 3,023,033 A * 2/1962 Koch ............................ 285/187
3,381,982 A * 5/1968 Elek ........................... 285/133.4
(Continued)

FOREIGN PATENT DOCUMENTS

DE        4304680       4/1994
DE       20104340       7/2002
(Continued)

*Primary Examiner* — David E Bochna
(74) *Attorney, Agent, or Firm* — Occhiuti & Rohlicek LLP

(57) ABSTRACT

A pipe connection comprises a connecting piece, a pipe and a clamping ring. The pipe and the clamping ring are made of a material having memory properties. An end of the pipe and the clamping ring have been reversibly expanded co-jointly and firmly and sealingly shrunk to the connecting piece by back shrinkage. Preferably the clamping ring is made from a cross-linked polyolefin by injection molding.

16 Claims, 2 Drawing Sheets

(51) Int. Cl.
  *B29C 65/02* (2006.01)
  *B29K 23/00* (2006.01)
  *F02M 35/10* (2006.01)

(56) References Cited

U.S. PATENT DOCUMENTS

| | | | |
|---|---|---|---|
| 3,847,183 A | | 11/1974 | Meyer |
| 4,227,414 A | * | 10/1980 | Elkins |
| 4,321,911 A | * | 3/1982 | Offutt ............................ 285/242 |
| 4,445,714 A | * | 5/1984 | Kisiel, III ........................ 285/23 |
| 4,451,070 A | * | 5/1984 | Sauer ............................ 285/242 |
| 4,993,756 A | * | 2/1991 | Bechu ........................ 285/381.4 |
| 5,228,721 A | * | 7/1993 | Whittle et al. ................... 285/23 |
| 5,240,263 A | * | 8/1993 | Nicholson ..................... 277/614 |
| 5,568,948 A | * | 10/1996 | Bartholomew ............... 285/242 |
| 5,735,554 A | * | 4/1998 | Imgam ........................ 285/242 |
| 6,231,085 B1 | * | 5/2001 | Olson .................... F16L 33/24 |
| | | | 285/242 |
| 6,270,125 B1 | | 8/2001 | Rowley et al. |
| 6,367,850 B1 | | 4/2002 | Thrift et al. |
| 6,439,621 B1 | * | 8/2002 | Altmann et al. ............ 285/381.4 |
| 6,585,297 B2 | * | 7/2003 | Mullen, Jr. ............. F16L 41/10 |
| | | | 285/251 |
| 6,641,177 B1 | | 11/2003 | Pinciaro |
| 2005/0121913 A1 | | 6/2005 | Smahl |
| 2005/0133509 A1 | | 6/2005 | Nagakura et al. |

FOREIGN PATENT DOCUMENTS

| | | |
|---|---|---|
| EP | 0073048 | 3/1983 |
| EP | 0530387 | 3/1993 |
| EP | 0682758 | 8/1998 |
| EP | 0725908 | 11/1998 |
| EP | 1240981 | 7/2003 |
| RU | 2 141 600 | 11/1999 |
| WO | WO 94/18486 | 8/1994 |

* cited by examiner

PIPE CONNECTION

CROSS-REFERENCE TO RELATED APPLICATIONS

This is the national stage, under 35 USC 371, of International Application No. PCT/FI2006/050322, filed on Jul. 7, 2006, which claims the benefit of the Jul. 8, 2005 priority date of European Application No. 05106243.8. The contents of each of the above-referenced applications is incorporated herein by reference in its entirety.

The invention relates to a method and arrangement in connection with a pipe connection, a clamping ring for a pipe connection, and a pipe connection.

It is known to provide a pipe connection between one end of a pipe made of a plastic material that has memory properties and a connecting piece. The memory properties mean that plastic pipes with a memory capacity automatically strive to return essentially to their original shape and form after having been expanded. For example plastic pipes that are manufactured from cross-linked polyethylene possess an active memory capacity at temperatures as low as room temperature. Pipes of this nature are joined together by widening one end of the pipe and inserting into the widened pipe-end a flanged connector which forms a part of the pipe connecting piece, normally made of metal, and which is retained in said pipe-end until the pipe has shrunk to an extent at which it is able to firmly hold the connecting piece. A clamping ring made of elastic material, which may be the same plastic material as that from which the pipe is made, is expanded and shrunk over the pipe end, in order to further enhance the holding and sealing pressure at the pipe connection region. The clamping ring is expanded at the same time as the pipe-end is expanded, with the clamping ring in position around said pipe-end. Such a solution has been disclosed for example in EP 0 530 387. The clamping ring has been made from an extruded pipe by cutting the pipe into a short enough part to form a clamping ring.

There is now provided an enhanced solution for making a pipe connection. This solution may be achieved by a method, an arrangement, a clamping ring and a pipe connection, which are characterized by what is disclosed in the independent claims. Some embodiments of the invention are set for the independent claims.

According to one aspect the pipe connection comprises a connection piece, a pipe and a clamping ring. The pipe and the clamping ring are made of a material having memory properties, wherein an end of the pipe and the clamping ring have been reversibly expanded co-jointly and firmly and sealingly shrunk to the connecting piece by back shrinkage. The connection piece comprises a nipple end. The clamping ring is formed such that it is used for protecting the nipple end of the connecting piece. The clamping ring is slipped over the nipple end during storage and transportation before the pipe connection is made. Thus the clamping ring protects the nipple end from being damaged during storage and transportation.

According to one embodiment the clamping ring is made from a cross-linked polyolefin by injection molding. By making the clamping rings with injection molding it is possible to optimize the properties of the clamping ring for each pipe connection. For example the wall thicknesses and the design of the clamping ring can be made as per need. It is also possible to make markings into the clamping ring to give information on the clamping ring to an end user.

According to another embodiment, the clamping ring is formed such that the total length of a weld line/weld lines in the radial direction in the injection molded clamping ring is larger than an average wall thickness of the clamping ring. The clamping ring is for example formed such that at a point where the weld line resides, the wall thickness is larger than the average wall thickness. Another possibility to increase the total length of the weld lines is to provide an injection molding mold into which the material is fed from two or more injection gates, such that the clamping ring comprises two or more weld lines. Also in this connection all the weld lines may be positioned such that they are formed at a position where the wall thickness is larger than the average wall thickness. Typically, the weld line is the weakest spot of an injection molded particle that is made from a cross-linked polyethylene. However, when the total length of the weld line is larger than the average wall thickness, the strength of the clamping ring is increased. Thus, the risk for cracks in the weld line during an expansion procedure is minimized. According to yet another embodiment, one end of the clamping ring is provided with a stop edge. This stop edge ensures that the clamping ring remains positioned at a correct position on the pipe-end when the pipe connection is being made and after the pipe connection has been made.

BRIEF DESCRIPTION OF THE FIGURES

In the following, the invention will be described in greater detail by means of preferred embodiments with reference to the accompanying drawings, in which FIG. 1 schematically shows a cross-sectional side view of a pipe connection, FIG. 2 schematically shows a cross-sectional end view of a clamping ring.

DETAILED DESCRIPTION OF THE INVENTION

Figure 1:
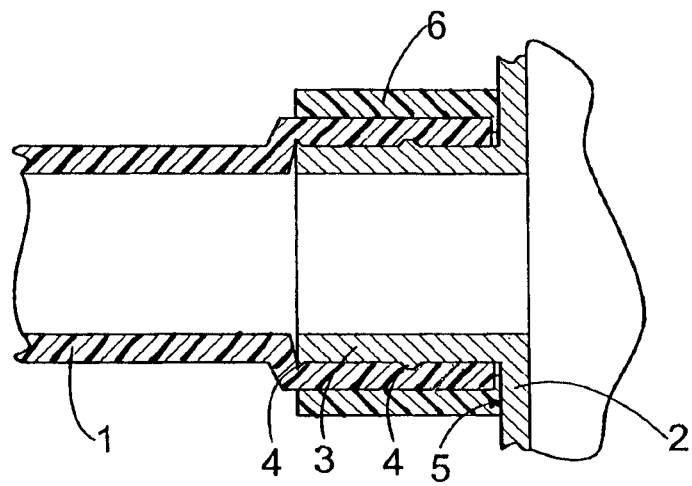

FIG. 1 shows a pipe 1, which is comprised of a plastic material having memory properties, for instance a cross-linked polyethylene PEX or any other cross-linked polyolefin, and a connecting piece 2 made of metal. The connecting piece 2 comprises a nipple end 3. The nipple end 3 comprises radially projecting flanges 4. The nipple end 3 is terminated with a radial abutment surface 5. The nipple end 3 has an outer diameter which exceeds the inner diameter of the unexpanded pipe 1. An elastic clamping ring 6 is mounted on an end of the pipe 1. In its relaxed state, the clamping ring 6 has an inner diameter which corresponds to the outer diameter of the unexpanded pipe 1.

Figure 4:
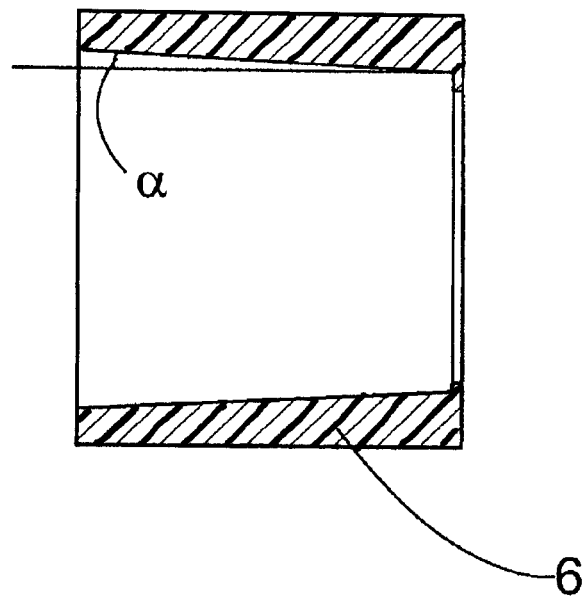

Preferably the inner surface of the clamping ring 6 is conical as shown in FIG. 4. This feature enables the clamping ring 6 to be positioned on the end of the pipe 1 with a tight fitting. Thus, because of the conical shape, it is easy to position the clamping ring on the end of the pipe 1 and further, because of the conical shape, the inner surface of the clamping ring 6 presses against the outer surface of the pipe 1 and the clamping ring 6 remains with a tight fitting on the end of the pipe 1. Thus it is easy to establish the pipe connection because the risk of the clamping ring 6 dropping from the pipe end is thus minimized. The coning angle α of the inner surface of the clamping ring 6 can be in the range of 0.1° to 2°, for example.

Figure 5:
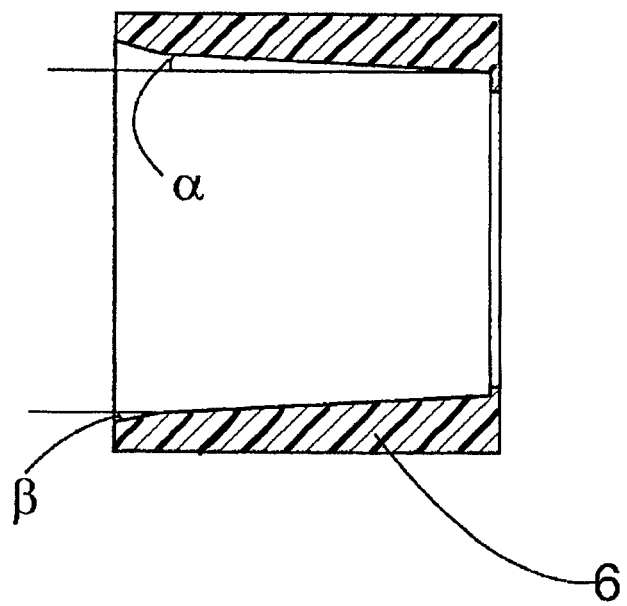

The inner surface of the clamping ring 6 can be made conical also such that first at the outer end of the clamping ring 6 there is a first larger coning angle β and thereafter a second smaller coning angle α as shown in FIG. 5. The first larger coning angle β provides the advantage that the positioning of the clamping ring on the end of the pipe 1 is extremely easy. Because of the second smaller coning angle α the clamping ring 6 remains with a tight fitting on the end of the pipe 1. The first coning angle β can be in the range of 3° to 7° and the second coning angle α can be in the range of 0.1° to 2°, for example.

When establishing the pipe connection shown in FIG. 1, the end of pipe 1 and the surrounding clamping ring 6 are expanded simultaneously by an expander tool. The nipple end 3 is then immediately inserted into the end of the pipe until the abutment surface 5 is in abutment with the end of the pipe 1 and with the clamping ring 6. The end of the pipe 1 and the clamping ring 6 then shrink or contract automatically, so as to obtain a sealing contact between the inner surface of the pipe 1 and the flange 4 in particular. The sealing contact is also obtained between the inner surface of the pipe 1 and the outer surface of the nipple end 3.

Figure 2:
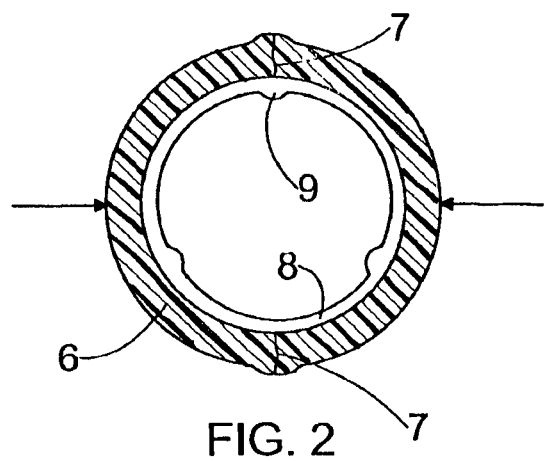

FIG. 2 shows a cross-section of the clamping ring. When the ring is injection molded, the material is fed into a mold. The clamping ring shown in FIG. 2 is made such that the mold comprises two injection gates. Thus, the material is fed into the mold from both sides of the mold, which in FIG. 2 is depicted with arrows. The two material flows flow into the mold and they come into contact with each other. Therefore, a weld line 7 is formed at a point where the material flows unite. Because in FIG. 2 the material has been fed through two injection gates, two weld lines 7 exist in the clamping ring. If the material is fed from only one injection gate, the weld line 7 is formed substantially on the opposite side of the injection gate. Typically, no weld lines 7 can be seen in an injection molded object, but in FIG. 2 the weld lines 7 have been indicated with narrow lines.

Typically, a weld line is the weakest spot of an injection molded ring, especially when the ring is made from a cross-linked polyolefin. However, the total length of the weld line 7 in the radial direction is made larger than the average wall thickness of the clamping ring 6. The total length of the weld lines can be made larger for example by using more than one injection gate, such that the ring comprises two or more weld lines 7.

Also, if only one injection gate is provided and, therefore, only one weld line, the weld line can be made longer such that the wall thickness of the clamping ring is made larger at a position where the weld line resides. Thus, this means that the wall of the clamping ring is at its thickest at the weld line.

Also, if several weld lines are provided, the wall thickness at the weld line can be made larger, as is also shown in FIG. 2.

Thus, the thicker wall at the weld line strengthens the clamping ring. Further, a mold with two or more, e.g. three or four, up to six, injection gates, gives more weld lines. When several weld lines are provided, the expansion force per one weld line is lower and thus the clamping ring is stronger.

The diameter of the clamping ring may vary e.g. between 15 to 50 mm. The length of the clamping ring 6 may be e.g. substantially equal to the diameter of the clamping ring. The length of the clamping ring may also be dimensioned such that it is substantially equal to the length of the nipple end 3 of the connecting piece 2. An average wall thickness of the clamping ring may vary e.g. between 2 to 6 mm. The wall thickness of the clamping ring determines the contraction force of the clamping ring. Thus, the wall thickness of the clamping ring is dimensioned such that the contraction force is sufficient. If the wall is made thicker at the weld line 7, the wall may be e.g. 0.3 to 2 mm thicker than the average wall thickness.

The clamping ring 6 is made from a cross-linked polyolefin. The clamping ring may be made e.g. of a cross-linked polyethylene PEX or cross-linked polypropylen. Preferably, the clamping ring 6 is made from a PEX-B material, i.e. a silane PEX. When a PEX-B material is used, cross-linking starts by the effect of heat. Therefore, a PEX-B material is advantageous in connection with injection molding.

Figure 3:
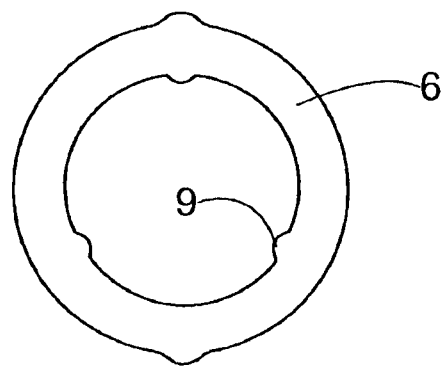
FIG. 3 shows an end view of the clamping ring as seen from an end other than that in FIG. 2, FIG. 4 schematically shows a cross-sectional side view of a clamping ring and FIG. 5 schematically shows a cross-sectional side view of another clamping ring.

One end of the clamping ring is provided with a stop edge 8. The stop edge 8 ensures that the end of the pipe 1 is at a correct position with respect to the clamping ring 6. The stop edge 8 extends inwards. The stop edge 8 comprises inwardly extending protrusions 9, which are also seen in FIG. 3. The protrusions 9 ensure that the pipe 1 stops at a correct position with respect to the clamping ring 6. Further, the protrusions 9 are made high enough for the clamping ring to be used for protecting the nipple end 3 of the connecting piece before the pipe connection is made. The inner diameter of the clamping ring, when the clamping ring 6 is in its original form and shape, is larger than the outer diameter of the nipple end 3. However, the protrusions are high enough to extend to a circumference that is smaller than the outer diameter of the flanges 4 of the nipple end 3. Thus, the clamping ring 6 can be snapped on the nipple end 3, such that the protrusions 9 and the flanges 4 hold the clamping ring 6 on the nipple end 3. Thus, the clamping ring 6 protects the nipple end from being damaged, which could cause leakage problems. Thus, during storage and transportation the nipple end is not damaged.

Instead of the protrusions 9, the means for holding the clamping ring 6 on the nipple end 3 can be a radially inward protruding ring which has been made thin enough such that it yields when the clamping ring 6 is snapped on the nipple end 3, for example.

Instead of injection molding the clamping ring can be made from an extruded pipe by cutting the pipe in to a short enough part to form a clamping ring, for example. After cutting, the appropriate protrusions and other needed forms can be formed to the clamping ring by thermoforming, for example.

In some cases the features shown in this description can be used as such irrespective of other features. Then again the features shown in this description may if necessary be combined in order to form different combinations.

It is obvious to a person skilled in the art that in the course of technical progress, the basic idea of the invention can be carried out in numerous ways. Thus, the invention and its embodiments are not limited by the previous examples, but they may vary within the scope of the appended claims. Further, the clamping ring may e.g. comprise a hole, through which it can be detected whether the pipe is pushed correctly inside the clamping ring 6.

The invention claimed is:

1. A clamping ring, comprising a cross-linked polyolefin material having memory properties that cause the clamping ring to automatically return to its original shape and form after having been expanded, wherein the clamping ring comprises a first end, and a stop edge disposed at the first end extending inwardly and along a radial axis of the clamping ring, the stop edge having a stop edge inner surface configured to abut an end surface of a pipe of the pipe connection and a stop edge outer surface configured to abut an abutment surface of a connecting piece of the pipe connection such that the clamping ring is aligned, wherein the stop edge comprises protrusions.

2. The clamping ring of claim 1, wherein the clamping ring comprises one or more weld lines, a total length of which, in a radial direction, is larger than an average wall thickness of the clamping ring.

3. The clamping ring of claim 2, wherein the one or more weld lines comprises at most one weld line, wherein the at most one weld line is formed at a position where a wall thickness of the clamping ring is larger than the average wall thickness of the clamping ring.

4. The clamping ring of claim 2, wherein the clamping ring is formed such that the clamping ring comprises two or more weld lines.

5. The clamping ring of claim 1, wherein the clamping ring is made from a PEX-B (a cross-linked polyethylene) material.

6. The clamping ring of claim 1, wherein the clamping ring is aligned into a correct position on the pipe connection.

7. The clamping ring of claim 1, wherein the stop edge inner surface extends perpendicular to a longitudinal axis of the clamping ring and a conical inner surface of the clamping ring extends in a straight line from a second end of the clamping ring toward the first end of the clamping ring and terminates at the stop edge inner surface.

8. The clamping ring of claim 1, wherein the material of the clamping ring is continuous around a circumference of the clamping ring.

9. A clamping ring, comprising a cross-linked polyolefin material having memory properties that cause the clamping ring to automatically return to its original shape and form after having been expanded, wherein the clamping ring comprises a first end and a stop edge disposed at the first end extending inwardly and along a radial axis of the clamping ring, the stop edge having a stop edge inner surface configured to abut an end surface of a pipe of the pipe connection and a stop edge outer surface configured to abut an abutment surface of a connecting piece of the pipe connection such that the clamping ring is aligned, wherein an inner surface of the clamping ring is conical, the conical inner surface having an inner diameter tapering from a second end of the clamping ring toward the first end of the clamping ring.

10. The clamping ring of claim 9, wherein the conical inner surface of the clamping ring is formed such that a first portion of the conical inner surface that extends from an outer end of the clamping ring has a first coning angle that is larger than a second coning angle of a second portion of the conical inner surface that extends from the first portion to an inner end of the clamping ring.

11. A pipe connection comprising: a connecting piece, a pipe including a pipe end surface extending in a direction perpendicular to a longitudinal axis of the pipe, and a clamping ring including a first end, wherein the pipe and the clamping ring are made from a cross-linked polyolefin material having memory properties that cause the pipe and clamping ring to automatically return to their original shapes and forms after having been expanded, the clamping ring at its first end comprises a stop edge extending inwardly and along a radial axis of the clamping ring, the stop edge having a stop edge inner surface extending perpendicular to a longitudinal axis of the clamping ring, the stop edge inner surface configured to abut the pipe end surface when the clamping ring is positioned on the pipe such that the clamping ring is aligned, and an end section of the pipe and the clamping ring have been reversibly expanded co-jointly and firmly and sealingly shrunk to the connecting piece by back shrinkage, wherein the stop edge comprises protrusions.

12. The pipe connection of claim 11, wherein the clamping ring is made from a PEX-B material.

13. The pipe connection of claim 11, wherein the clamping ring is aligned into a correct position on the pipe connection.

14. The pipe connection of claim 11, wherein the clamping ring has a first inner diameter prior to formation of the pipe connection and a second inner diameter, greater than the first inner diameter after formation of the pipe connection.

15. A pipe connection comprising: a connecting piece, a pipe including a pipe end surface extending in a direction perpendicular to a longitudinal axis of the pipe, and a clamping ring including a first end, wherein the pipe and the clamping ring are made from a cross-linked polyolefin material having memory properties that cause the pipe and clamping ring to automatically return to their original shapes and forms after having been expanded, the clamping ring at its first end comprises a stop edge extending inwardly and along a radial axis of the clamping ring, the stop edge having a stop edge inner surface extending perpendicular to a longitudinal axis of the clamping ring, the stop edge inner surface configured to abut the pipe end surface when the clamping ring is positioned on the pipe such that the clamping ring is aligned, and an end section of the pipe and the clamping ring have been reversibly expanded co-jointly and firmly and sealingly shrunk to the connecting piece by back shrinkage, wherein the clamping ring further comprises a conical inner surface having an inner diameter tapering from a second end of the clamping ring toward the first end of the clamping ring.

16. The pipe connection of claim 15, wherein the conical inner surface of the clamping ring is formed such that a first portion of the conical inner surface that extends from an outer end of the clamping ring has a first coning angle that is larger than a second coning angle of a second portion of the conical inner surface that extends from the first portion to an inner end of the clamping ring.

* * * * *